US007115035B2

(12) United States Patent
Tanaka

(10) Patent No.: US 7,115,035 B2
(45) Date of Patent: Oct. 3, 2006

(54) METHOD FOR CONTROLLING DISPLAY OF MESSAGES TRANSMITTED/RECEIVED IN NETWORK GAME

(75) Inventor: Hiromichi Tanaka, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 629 days.

(21) Appl. No.: 10/318,222

(22) Filed: Dec. 13, 2002

(65) Prior Publication Data
US 2003/0134678 A1 Jul. 17, 2003

(30) Foreign Application Priority Data
Dec. 14, 2001 (JP) ............... 2001-381655

(51) Int. Cl.
A63F 9/24 (2006.01)
A63F 13/00 (2006.01)
G06F 17/00 (2006.01)

(52) U.S. Cl. ............... 463/42; 463/40; 463/41; 709/206; 709/207

(58) Field of Classification Search ............... 709/206, 709/207, 204; 463/40, 42, 43, 41
See application file for complete search history.

(56) References Cited
U.S. PATENT DOCUMENTS 5,369,756 A 11/1994 Imura et al.
6,691,162 B1* 2/2004 Wick ............... 709/224
6,907,447 B1* 6/2005 Cooperman et al. ........ 709/203

FOREIGN PATENT DOCUMENTS
JP 2001005444 1/2001
JP 2001-167034 6/2001

OTHER PUBLICATIONS

Instant Messaging: IM Here to Stay, Oct. 24, 2005, http://www.cionsight.com/article2/0,1397,1570390,00.asp.*
In-Game messaging, Oct. 21, 2005, http://web.archive.org/web/20010222219657/http://rookscape.com/vbgaming/tutAl.php.*
Sue Morris, Online Multiplayer Computer Game Culture, Oct. 25, 2005, http://scan.net.au/scanjournal/display.php?journal_id=16.*
Quake 3 Arena Images, Oct. 24, 2005, http://dcmedia.ign.com/media/previews/image/quake3/quake7.jpg.*
ID Software, "Quake 3 Arena Demo", Quake 3 Demo, Dec. 3, 1999.
Lucky's VB Gaming Site: "VB DirectX Programming, In-game Messaging", downloaded from http://web.archive.org/web/200110222191657/http://rookscape.com/vbgaming/tutAI.php on Feb. 22, 2001.
English Language Abstract of JP Appln. No. 2001-005444.

* cited by examiner

Primary Examiner—Corbett B. Coburn
Assistant Examiner—Sunit Pandya
(74) Attorney, Agent, or Firm—Greenblum & Bernstein, P.L.C.

(57) ABSTRACT

Multiple video game apparatuses are connected to a game server apparatus. This network game progresses when players of the respective video game apparatuses exchange messages via the game server apparatus. When a predetermined event is generated by processing in the game server apparatus, a specific message is transmitted to each video game apparatus. In a chat window provided on a display screen of each video game apparatus, the message sent from the game server apparatus is scrolled and displayed from the bottom to the top. When the specific message reaches an uppermost portion of the chat window, a lock window is set and the specific message is displayed therein. The specific message in the lock window is not erased by the reception of a next message.

21 Claims, 11 Drawing Sheets

| EVENT REQUEST CODE | SPECIFIC MESSAGE CHARACTER STRING |
|---|---|
| x x x x x x x | HELLO, TODAY · · · · · · · · · · |
| x x x x x x x | HARRY UP ! · · · · · · · · · · · |
| x x x x x x x | EVENT IS STARTED FROM NOW ON ! |
| ⋮ | ⋮ |

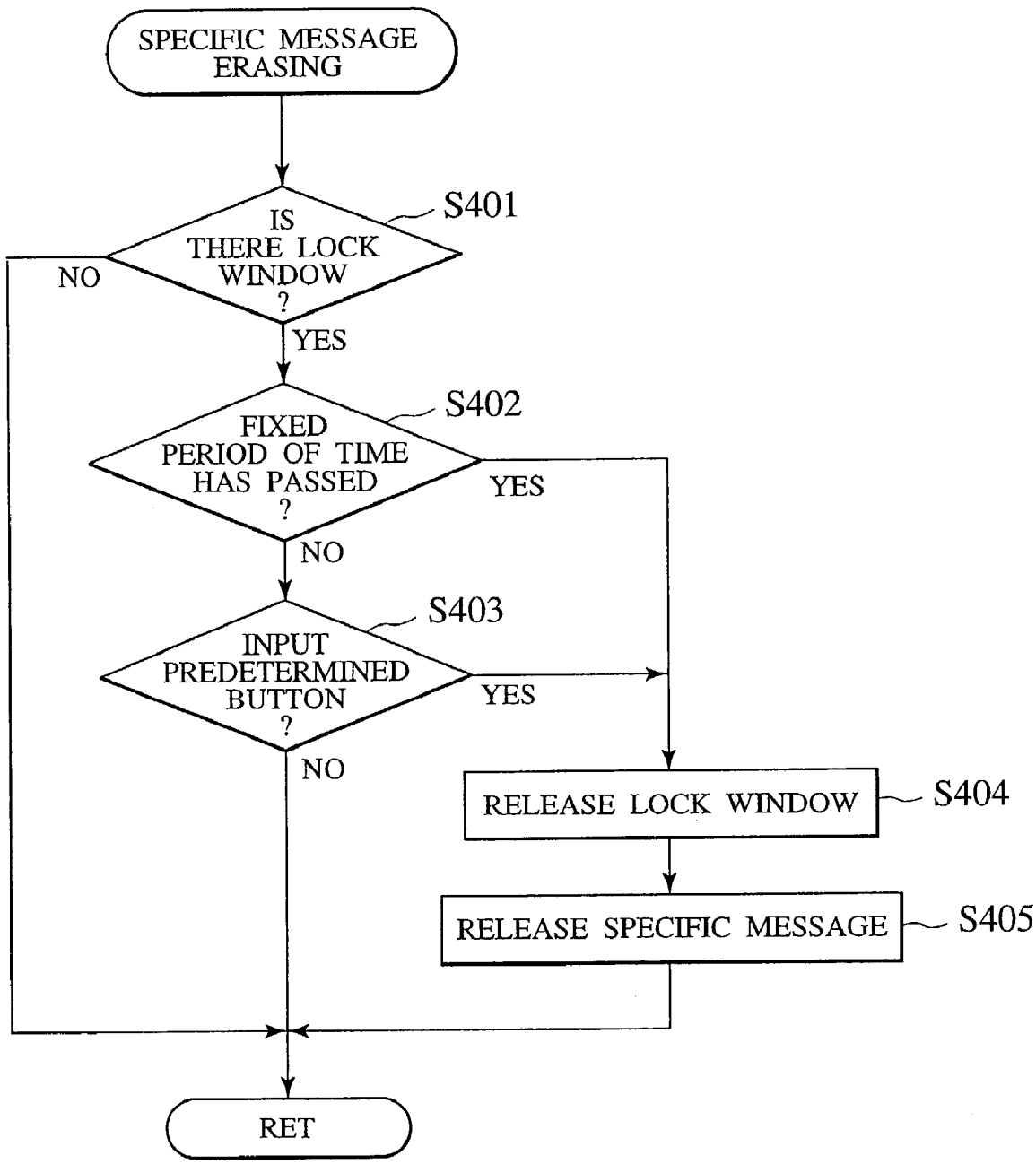

FIG.10A

AAA(SAY):WINDOW'S TEXT ~ ☆
BBB(SAY):REALLY ?
CCC(SAY):WELL, YES. ~~
DDD(SAY):EVENT IS STARTED, ISN'T IT ? ~~~~~
~~~~~~~~~~~~~~~~~~~!

FIG.10B

CCC(SAY):WELL, YES. ~~
DDD(SAY):EVENT IS STARTED, ISN'T IT ? ~~~~~
~~~~~~~~~~~~~~~~~~~!
NPC(SAY):HELLO. TODAY, PUDDING IS BURNED WELL.
WHY DON'T YOU GET IT ? ▽

FIG.10C

DDD(SAY):EVENT IS STARTED, ISN'T IT ? ~~~~~
~~~~~~~~~~~~~~~~~~~!
NPC(SAY):HELLO. TODAY, PUDDING IS BURNED WELL.
WHY DON'T YOU GET IT ? ▽
AAA(SAY):OH, IT'S STARTED. MESSAGE IS SO LONG !

FIG.10D

NPC(SAY):HELLO. TODAY, PUDDING IS BURNED WELL.
WHY DON'T YOU GET IT ? ▽
AAA(SAY):OH, IT'S STARTED. MESSAGE IS SO LONG !
BBB(SAY):GOOD !
CCC(SAY):EXCELLENT !

FIG.10E

NPC(SAY):HELLO. TODAY, PUDDING IS BURNED WELL.
WHY DON'T YOU GET IT ? ▽
AAA(SAY):OH, IT'S STARTED. MESSAGE IS SO LONG !
BBB(SAY):GOOD !
CCC(SAY):EXCELLENT !

FIG.10F

NPC(SAY):HELLO. TODAY, PUDDING IS BURNED WELL.
WHY DON'T YOU GET IT ? ▽
BBB(SAY):GOOD !
CCC(SAY):EXCELLENT !
DDD(SAY):USELESS. I CAN READ IT.

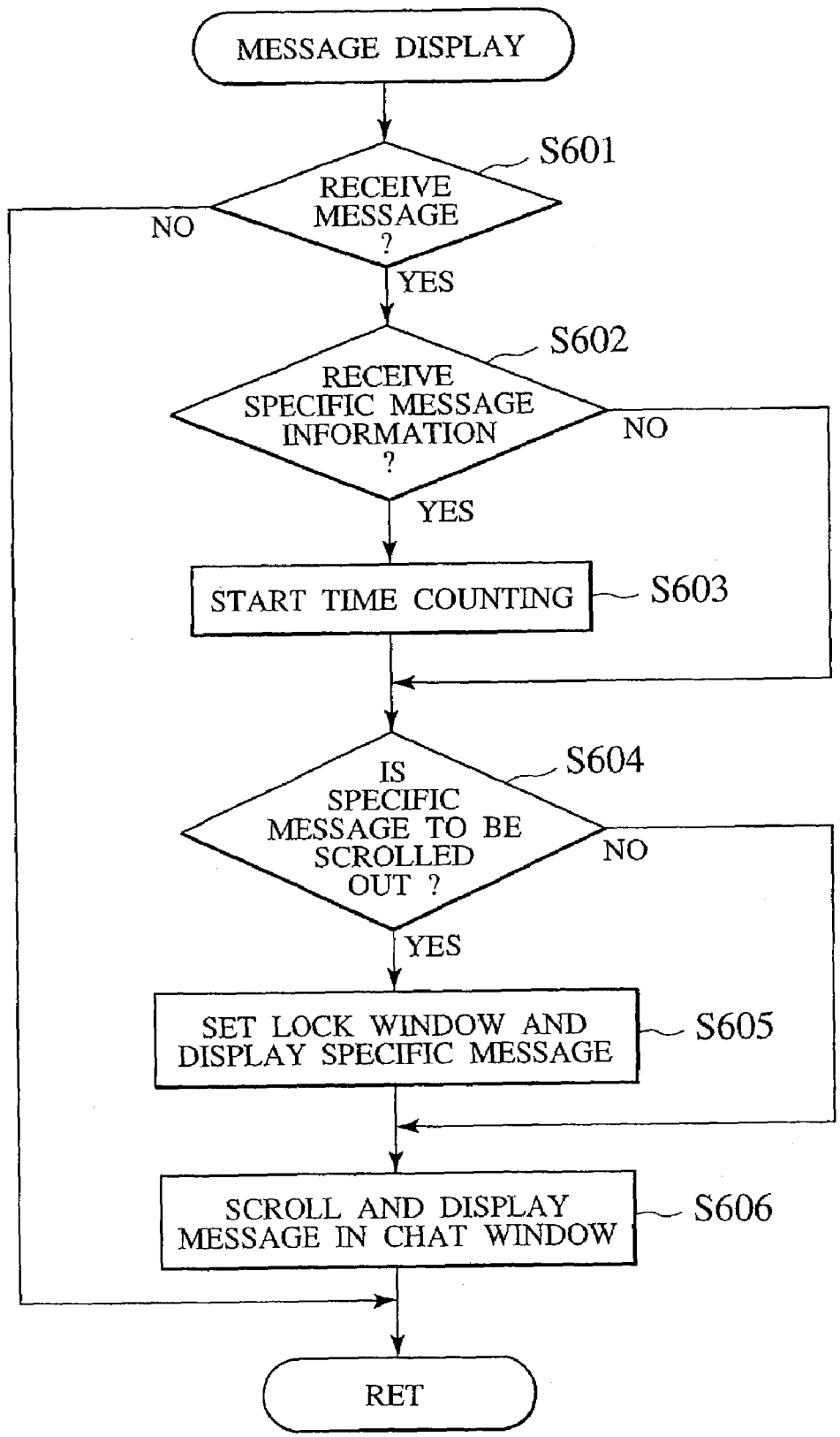

METHOD FOR CONTROLLING DISPLAY OF MESSAGES TRANSMITTED/RECEIVED IN NETWORK GAME

CROSS REFERENCE TO RELATED APPLICATION

The present disclosure relates to subject matter contained in Japanese Patent Application No. 2001-381655, filed on Dec. 14, 2001, the disclosure of which is expressly incorporated herein by reference in its entirety.

BACKGROUND OF THE INVENTION

1. Field of the Invention

The present invention relates to network video games. More particularly, the present invention relates to techniques of controlling display of messages at each player's terminal in a network game in which multiple players participate.

2. Description of the Related Art

The network game is one in which multiple players participate and progress the game. Some network games are designed such that the respective players perform communications through chat. Messages, which are input by the respective players and collected to a server apparatus, are sent to each player's video game apparatus and displayed in a chat window formed at a part (e.g., bottom) of a screen of the video game apparatus.

When an amount of messages sent to each player's video game apparatus increases, and all messages cannot be displayed in the chat window, the messages in the chat window are scrolled to display a new message in the chat window. All of the messages input by the respective players or specific messages to be inevitably displayed according to the progress of the game are displayed on a limited area of the chat window of the screen.

However, in the case where multiple players transmit the messages to the server apparatus during a short period of time and many messages are sent to each player's video game apparatus from the server apparatus, the respective messages are erased from the screen in a short period of time. In such a case, the players may fail to recognize all of the messages. Unless the players can recognize the messages that are important to the progress of the game, troubles occur in the progress of the game.

The player can check the messages erased from the chat window by scrolling and displaying the respective messages in a direction opposite to the general direction. In the case of general chat outside the network game, no big influence occurs even if such a method is used. In contrast, according to the network game, the game advances even while the player checks the messages once erased. At this time, in some cases, the player, who is checking the erased messages, is left behind in the progress of the game.

The scroll-display is applied to not only the display of a chat message in the network game but also the general display of the processing result using the computer. For example, Unexamined Japanese Patent Publication 2001-5444 discloses a scroll-display method in fields other than network games.

According to the method disclosed in this publication, when displaying and scrolling a table composed of multiple cells, a special row or special column, which is located near a row or column designated by a user, is left on a display screen. In the case of the table, the user can set the special row or special column at a predetermined position. However, it is not certain for the player what message was sent in the network game and in what order the message was sent. There is difficulty in grasping the messages in the network game based on the concepts of the special row and special column as in the above publication. Accordingly, the technique described in the above publication cannot be applied to the network game.

SUMMARY OF THE INVENTION

An object of the present invention is to scroll and display a message to have sufficient opportunities to cause a player to recognize an important message in a network game.

In order to attain the above object, a network game system according to a first aspect of the present invention has a server apparatus and multiple client apparatuses each connected to the server apparatus via a network. The server apparatus includes a server message receiver that receives messages from each of the client apparatuses. The server apparatus further includes a server message transmitter that transmits messages on progress of a game including the messages received by the server message receiver to each of the client apparatuses via the network. The server apparatus further includes a specific information transmitter that transmits specific information when the server message transmitter transmits a specific message, which specific information indicates that the transmitted message is the specific message. Each of the client apparatuses includes a message input device that inputs a desired message on the progress of the game according to a user's operation. Each of the client apparatuses further includes a client message transmitter that transmits the messages input from the message input device via the network to cause the server message receiver to receive the messages. Each of the client apparatuses further includes a client message receiver that receives messages transmitted from the server message transmitter. Each of the client apparatuses further includes a specific information receiver that receives the specific information transmitted from the specific information transmitter of the server apparatus. Each of the client apparatuses further includes a message display device that displays messages received by the client message receiver while scrolling the messages sequentially. Each client apparatus further includes a display controller that controls scroll-display displayed by the message display device such that the display of the message corresponding to specific information received by the specific information receiver is prevented from being erased from a display area on the display device until a predetermined condition is satisfied.

In the network game system according to the above first aspect, the messages received by the respective client apparatuses are sequentially scrolled and displayed by the message display device. However many other messages are received, and the display of a message corresponding to specific information is not erased. Because specific information is also transmitted by the specific information transmitter, it makes it possible for the player to sufficiently check the messages, which are important to the progress of the game, regardless of the frequencies of sending messages until a predetermined condition is satisfied.

In order to attain the above object, a game server apparatus according to a second aspect of the present invention is connected to multiple client apparatuses via a network. The game server apparatus includes a message receiver that receives messages input by players of the client apparatuses via the network. The game server apparatus further includes a message transmitter that transmits messages on progress of a game including the messages received by the message receiver via the network such that the messages are sequentially scrolled and displayed in each of the client apparatuses. The game server apparatus further includes a specific information transmitter that transmits specific information when the message transmitter transmits a specific message such that the display of the specific message is prevented from being erased in each of the client apparatuses until a predetermined condition is satisfied.

In the game server apparatus according to the above second aspect, specific information is also transmitted by the specific information transmitter, and the display of the messages, which are important to the progress of the game, are thereby prevented from being erased regardless of the frequency of sending messages until a predetermined condition is satisfied. Particularly, a message at an event generating time and a message received from a specific client apparatus are important to the progress of the game in some cases. The player can recognize these important messages without fail.

In order to attain the above object, a game server apparatus according to a third aspect of the present invention is connected to multiple client apparatuses via a network. The game server apparatus includes a memory that stores a network game program. The game server apparatus further includes a processor that executes the network game program. The game server apparatus further includes a communications apparatus that performs communications with the client apparatuses. The network game program causes the processor to receive messages input by players of the client apparatuses via the network. The network game program further causes the processor to transmit messages on progress of a game including the messages received from the client apparatuses via the network such that the messages are sequentially scrolled and displayed in each of the client apparatuses. The network game program further causes the processor to transmit specific information such that the display of a specific message is prevented from being erased from a display area on a display device in each of the client apparatuses until a predetermined condition is satisfied.

In the game server apparatus according to the third aspect, the network game program stored in the memory can be provided as being recorded on a computer-readable storage medium. This computer-readable storage medium may be a storage medium, which is structured to be attachable and detachable to and from the computer apparatus to be provided separately from the computer apparatus. This computer-readable storage medium may be a storage medium such as a fixed disk apparatus, which is provided in the computer apparatus and provided together with the computer apparatus. The network game program stored in the memory in the game server apparatus according to the third aspect can be distributed via a network from another server apparatus existing on the network after superimposing the data signal of the program on a carrier wave.

In order to attain the above object, a video game apparatus according to a fourth aspect of the present invention is connected, via a network, to a server apparatus, which is connected to at least one other video game apparatus via the network. The video game apparatus includes a message input device that inputs a desired message on the progress of a game according to a player's operation. The video game apparatus further includes a message transmitter that transmits the message input from the message input device to the server apparatus via the network. The video game apparatus further includes a message receiver that receives messages on the progress of the game including the messages received from the respective video game apparatuses connected to the server apparatus from the server apparatus via the network. The video game apparatus further includes a specific information receiver that receives specific information from the server apparatus via the network, when a message to be received by the message receiver is a specific message, which specific information indicates that the received message is the specific message. The video game apparatus further includes a message display device that displays messages received by the message receiver while scrolling the messages sequentially. The video game apparatus further includes a display controller that controls scroll-display displayed by the message display device such that the display of a message corresponding to specific information received by the specific information receiver is prevented from being erased until a predetermined condition is satisfied.

In the video game apparatus according to the fourth aspect, the display of a specific message where specific information is also received is prevented from being erased regardless of the frequency of receiving messages by the message receiver until a predetermined condition is satisfied. Accordingly, the player can sufficiently check the specific messages, which are important to the progress of the game.

In order to attain the above object, a video game apparatus according to a fifth aspect of the present invention is connected, via a network, to a server apparatus, which is connected to at least one other video game apparatus via the network. The video game apparatus includes a memory that stores a network game program. The video game apparatus further includes a processor that executes the network game program. The video game apparatus further includes a display device that displays a processing result of the network game program performed by the processor. The video game apparatus further includes a communications apparatus that communicates with the server apparatus. The network game program causes the processor to execute inputting a desired message on progress of a game according to a user's operation, transmitting the input message to the server apparatus via the network. The network game program further causes the processor to receive messages on the progress of the game including the messages, which the server apparatus received from the video game apparatus and the other video game apparatuses, from the server apparatus via the network. The network game program further causes the processor to receive specific information, from the server apparatus via the network, when a message to be received is a specific message. The specific information indicates that the received message is the specific message. The network game program further causes the processor to display the received messages while scrolling the messages sequentially such that the display of the message corresponding to the specific information among the received messages is prevented from being erased from a display area on a display device until a predetermined condition is satisfied.

In the video game apparatus according to the fifth aspect, the network game program stored in the memory can be provided as being recorded on a computer-readable storage medium. This computer-readable storage medium may be a storage medium, which is structured to be attachable and detachable to and from the computer apparatus to be provided separately from the computer apparatus. This computer-readable storage medium may be a storage medium such as a fixed disk apparatus, which is provided in the computer apparatus and provided together with the computer apparatus. The network game program stored in the memory in the video game apparatus according to the fifth aspect can be distributed via a network from another server apparatus existing on the network after superimposing the data signal of the program on a carrier wave.

In order to attain the above object, a message transmitting method in a network game according to a sixth aspect of the present invention is executed in a server apparatus connected to multiple video game apparatuses via a network. The above method includes receiving messages input by players of the video game apparatuses via the network. The above method further includes transmitting messages on progress of a game including the messages received from the video game apparatuses via the network such that the messages are sequentially scrolled and displayed in each of the video game apparatuses. The above method further includes transmitting specific information such that the display of the message corresponding to the specific information is prevented from being erased from a display area on a display device in each of the video game apparatuses until a predetermined condition is satisfied.

In order to attain the above object, a message display controlling method in a network game according to a seventh aspect of the present invention is executed in a video game apparatus connected to a server apparatus, which is connected to at least one other video game apparatus, via a network. The above method includes inputting a desired message on progress of a game according to a player's operation. The above method further includes transmitting the input message to the server apparatus via the network. The above method further includes receiving messages on the progress of the game including messages, which the server apparatus received from the video game apparatus and the other video game apparatuses, from the server apparatus via the network. The above method further includes receiving specific information, from the server apparatus via the network, when a message to be received is a specific message. The specific information indicates that the received message is the specific message. The above method further includes displaying the received messages while scrolling the messages sequentially such that the display of the message corresponding to the specific information among the received messages is prevented from being erased from a display area on a display device until a predetermined condition is satisfied.

BRIEF DESCRIPTION OF THE DRAWINGS

FIG. 9 is a flowchart specifically showing specific message erase processing of FIG. 7;

FIGS. 10A to 10F are views each showing an example of a change in a message to be displayed in a chat window;

FIG. 12 is a flowchart showing message display processing in a modification of the embodiment of a present invention.

DETAILED DESCRIPTION OF THE PREFERRED EMBODIMENTS

Embodiments of the present invention will be specifically described with reference to the drawings.

Figure 1:
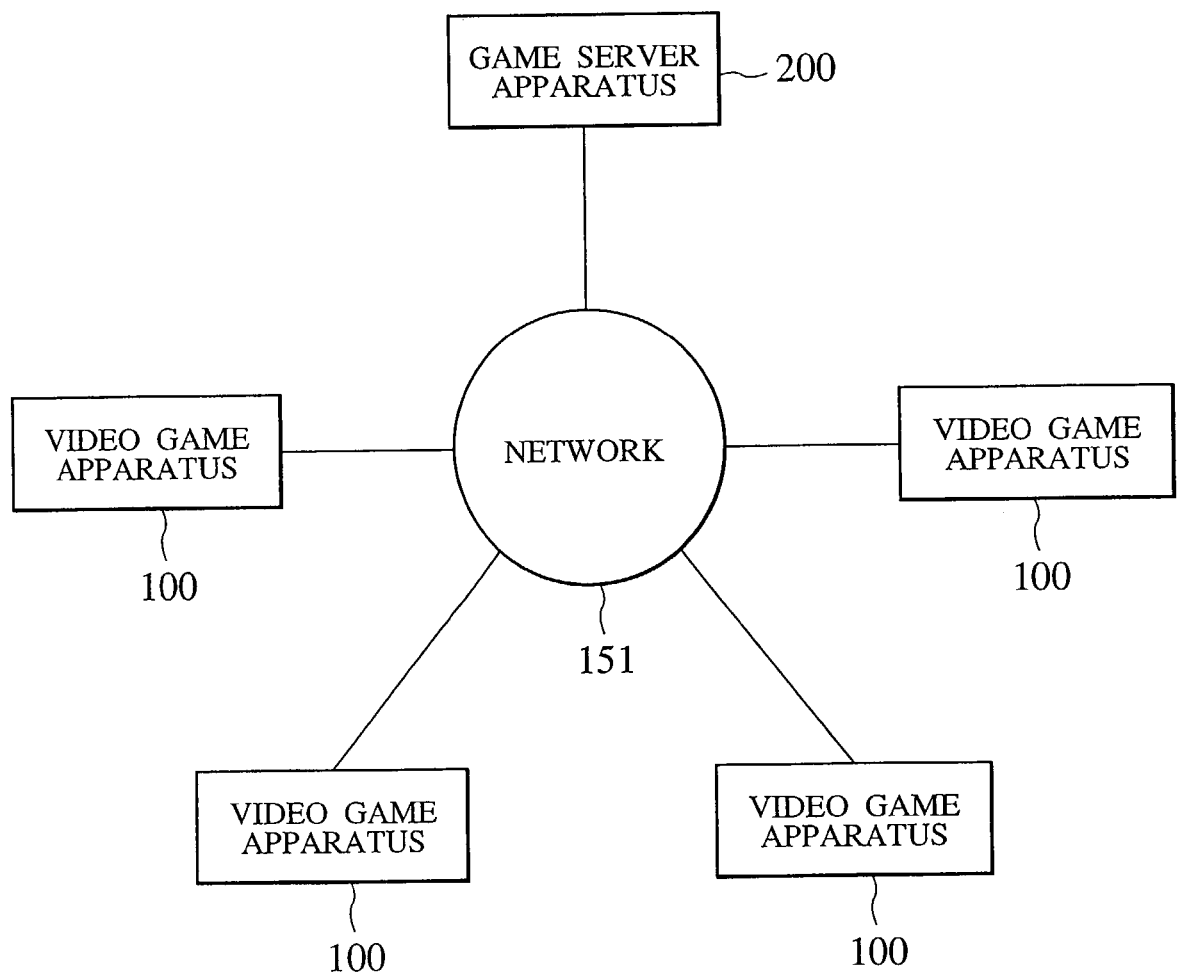
FIG. 1 is a block diagram showing a configuration of a network game system according to an embodiment of the present invention.

FIG. 1 is a block diagram showing a configuration of a network game system according to an embodiment of the present invention. As illustrated in the figure, this network game system includes multiple video game apparatuses 100 (four apparatuses here) and a game server apparatus 200. Each of the video game apparatuses 100 is connected to the game server apparatus 200 via a network 151.

In the network game provided by this system, four player characters, which are operated by four players, who are users of the respective video game apparatuses 100, join together to develop the game. Communications among the players are carried out by exchanging messages in the form of chat as each player character's words. In this network game, non-player characters, which are operated by processing of the game server apparatus 200, exist in addition to the four player characters. Non-player character words are inserted between the messages being exchanged between the players when a predetermined event occurs.

Figure 2:
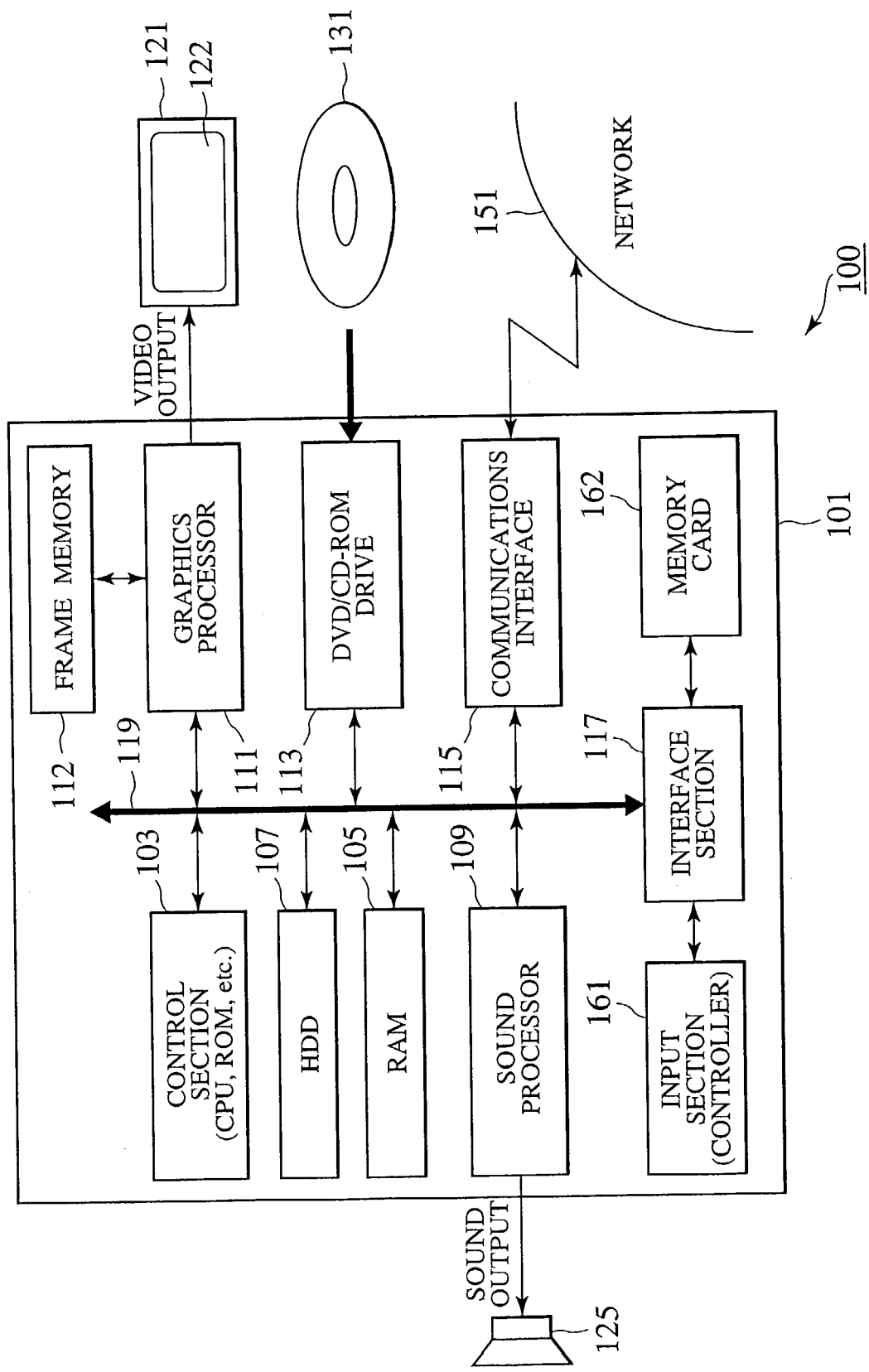
FIG. 2 is a block diagram showing a configuration of a video game apparatus of FIG. 1.

FIG. 2 is a block diagram showing a configuration of the video game apparatus 100 of FIG. 1. As illustrated in the figure, the video game apparatus 100 includes a video game machine main body 101. The video game machine main body 101 includes a control section 103 connected to its internal bus 119, a RAM (Random Access Memory) 105, a hard disk drive (HDD) 107, a sound processor 109, a graphics processor 111, a DVD/CD-ROM drive 113, a communications interface 115, and an interface section 117.

The sound processor 109 of the video game machine main body 101 is connected to a sound output device 125, which is a speaker, and the graphics processor 111 is connected to a display device 121 having a display screen 122. A storage medium (DVD-ROM or CD-ROM) 131 can be attached to the DVD/CD-ROM drive 113. The communications interface 115 is connected to a network 151. An input section (controller) 161 and a memory card 162 are connected to the interface section 117. A keyboard (not shown) as the input section 161 may be connected to the interface section 117.

The control section 103 includes a CPU (Central Processing Unit), a ROM (Read Only Memory), etc., and executes a program stored on the HDD 107 or the storage medium 131, and controls the video game apparatus 100. The control section 103 has an internal timer. The RAM 105 is a work area for the control section 103. The HDD 107 is a storage area for storing a program and data. In the case where a program executed by the control section 103 instructs the sound processor 109 to output a sound, the sound processor 109 interprets the instruction and outputs a sound signal to the sound output device 125.

The graphics processor 111 develops an image onto the frame memory 112 and outputs a video signal, which displays the image on the display screen 122 of the display device 121 according to a drawing command output from the control section 103. It is assumed that one frame time of the image included in the outputting video signal is, for example, 1/30 sec. The DVD/CD-ROM drive 113 performs writing/reading of the program and data to/from the storage medium 131. The communications interface 115 is connected to the network 151 to perform communications with other computers such as a server apparatus 200.

The interface section 117 outputs input data sent from the input section 161 to the RAM 105, and the control section 103 interprets it to carry out arithmetic processing. The input section 161 includes a directional key and multiple operation keys, moves a character (to be described later) by the operation of the directional key, and performs a predetermined processing by the operation of the operation keys. Moreover, the interface section 117 forwards data, indicative of the progress of the game stored in the RAM 105, to the memory card 162 based on the instruction from the control section 103. The interface section 117 reads data of the game stored in the memory card 162 at the time of stopping the game, and transfers read data to the RAM 105.

The program and data for performing the network game by the video game apparatus 100 are first stored on, for example, the storage medium 131. The program and data are read by the DVD/CD-ROM drive 113 and loaded onto the RAM 105 at the time of execution. The control section 103 processes the program and data loaded onto the RAM 105, outputs a drawing command to the graphics processor 111, and outputs an instruction of a sound output to the sound processor 109. Intermediate data is stored in the RAM 105 while the control section 103 performs processing.

In connection with the video game apparatuses 100, any general-purpose personal computer may be used as the video game machine main body 101 if the similar structural components are provided. A cellular phone having the same function as that of the video game machine main body 101 may be used. A portable video game player, which contains the display device 121 and the sound output device 125 in the same cabinet as that of the video game machine main body 101, may also be used.

In the case where the video game machine main body 101 is a portable video game player, a semiconductor memory card may be used as the storage medium 131 in place of a DVD-ROM or CD-ROM. A card slot for inserting the memory card may be formed in place of the DVD/CD-ROM drive 113. In the case where the video game machine main body 101 is a general-purpose personal computer, the program and data relating to the present invention may be prestored to the HDD 107 instead of being stored to the storage medium 131. Regarding the storage medium for storing the program and data relating to the present embodiment, any kind of storage medium may be used according to the physical form of hardware and the distribution thereof.

Figure 3:
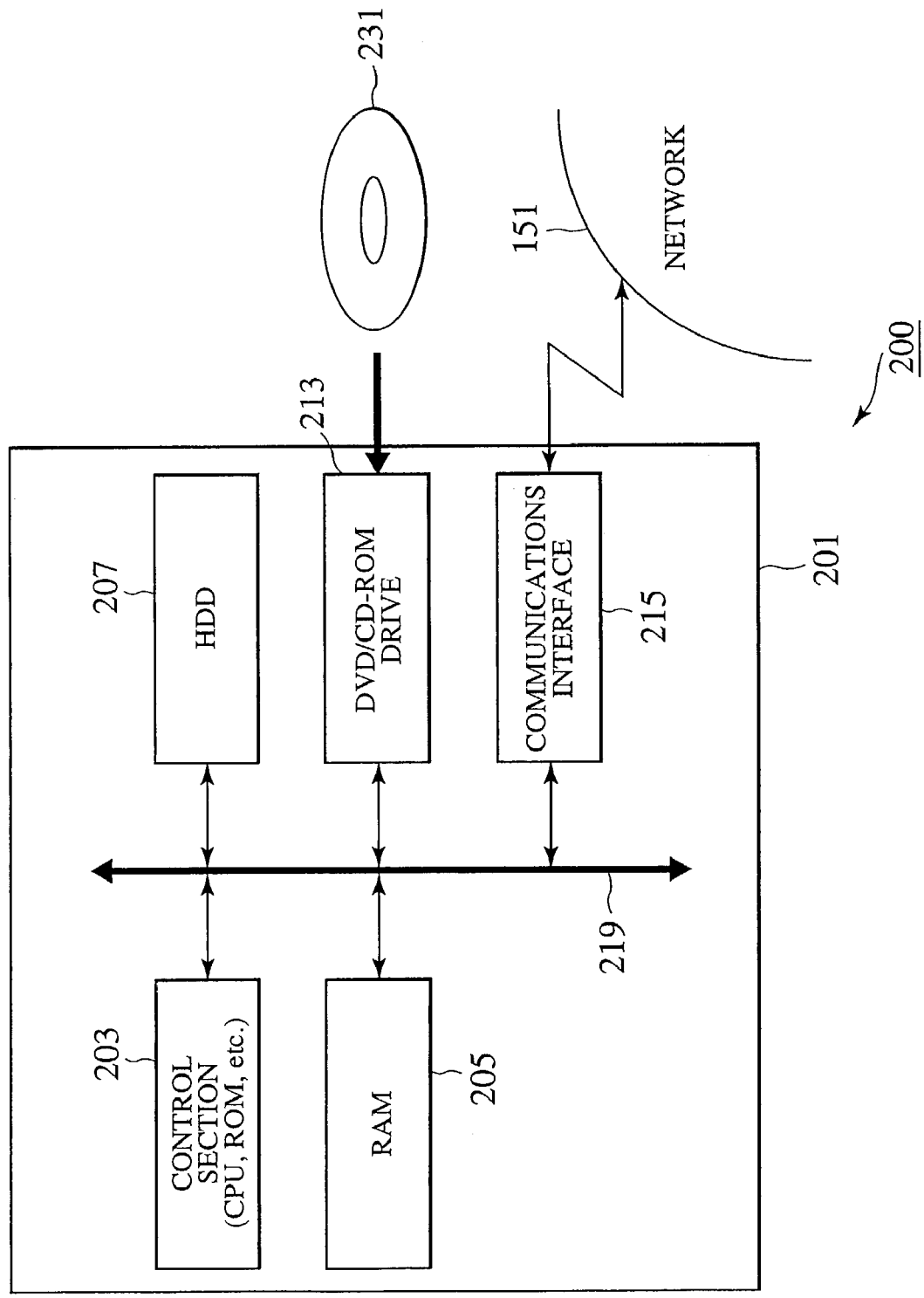
FIG. 3 is a block diagram showing the configuration of a game server apparatus of FIG. 1.

FIG. 3 is a block diagram showing the configuration of the game server apparatus 200 of FIG. 1. As illustrated in the figure, the game server apparatus 200 is constructed to have a game server main body 201. The game server main body 201 includes a control section 203 connected to its internal bus 219, a RAM 205, a hard disk drive (HDD) 207, a DVD/CD-ROM drive 213, and a communications interface 215. A storage medium (DVD-ROM or CD-ROM) 231 can be attached to the DVD/CD-ROM drive 213.

The control section 203 includes a CPU (Central Processing Unit), a ROM (Read Only Memory), etc., and executes a program stored on the HDD 207 or the storage medium 231, and controls the game server apparatus 200. The RAM 205 is a work area for the control section 203. The HDD 207 is a storage area for storing a program and data. The communications interface 215 is connected to the network 151 and performs communications with the video game apparatuses 100.

The program and data for performing the network game by the game server 200 are first stored on, for example, the storage medium 231. The program and data are read by the DVD/CD-ROM drive 213 and loaded onto the RAM 205 at the time of execution. The control section 203 processes the program and data loaded onto the RAM 205, and progresses the network game based on the messages sent from the video game apparatuses 100. Intermediate data is stored in the RAM 205 while the control section 203 performs processing.

An explanation will be next given of various kinds of data necessary to execute the network game according to this embodiment. Data processed by the video game apparatus 100 is displayed as an image on the display screen 122 and each player can recognize the progress of the network game from the image displayed on the display screen 122.

Figures 4, 5:
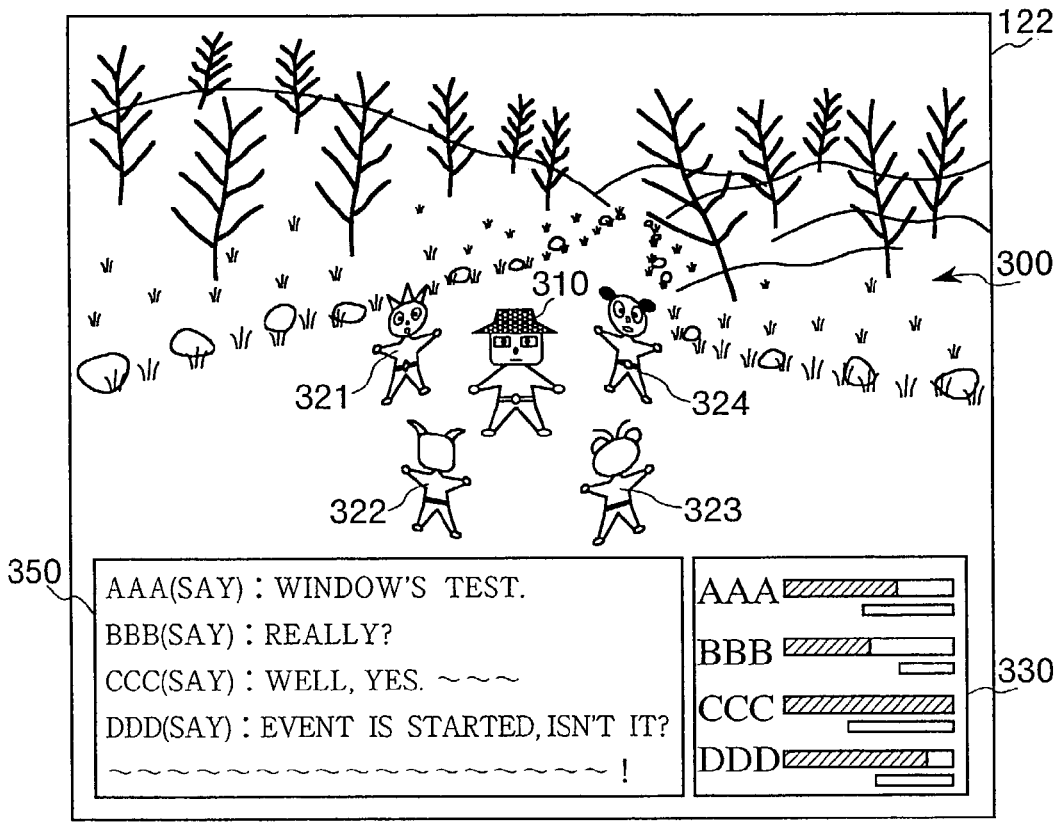
FIG. 4 is a view showing an example of a game screen page displayed by a video game apparatus of FIG. 2.
FIG. 5 is a view showing a specific message table provided in the video game apparatus of FIG. 2.

FIG. 4 is a view showing an example of the display screen 122 displayed according to the progress of the game at the video game apparatus 100. As illustrated in the figure, a field 300, which serves as a space where characters (including player characters and non-player characters) can move, is displayed on the display screen 122. The field 300 is composed of geographic data complying with each scene of the game. On the field 300, there exist player characters 321 to 324, which move when the users of four video game apparatuses 100 operate the input section 161, and a non-player character 310 which appears by processing of the game server apparatus 200.

At the lower right side of the display screen 122, a status window 330, which displays current statuses of the player characters 321 to 324, is provided. At the lower central to left side of the display screen 122, a chat window 350 is provided. In a chat window 350, messages, which are sent to the video game apparatus 100 from the game server apparatus 200 according to the progress of the network game, are sequentially scrolled and displayed. One line of the lowest portion of the chat window 350 is used as a message input window when the player inputs a message from the input section 161.

The messages sent from the game server apparatus 200 are displayed in the chat window 350. The messages displayed in the chat window 350 include messages, which the respective players input as words for the player characters 321 to 324 from the input section 161, and messages, which are output as words for the non-player character 310 from the game server apparatus 200.

Messages of the non-player character 310 include a specific message, which is output when the network game progresses according to a specific state and a predetermined event occurs. All messages of the non-player character 310 may be specific messages. The contents of the specific messages themselves are registered in the video game apparatus 100. The game server apparatus 200 transmits an event request in place of the specific message to each video game apparatus 100. The video game apparatus 100 receives the event request, and thereby displays a specific message of the corresponding content. The event request is also handled as one form of the message in connection with information to be transmitted to the video game apparatus 100 from the game server apparatus 200.

FIG. 5 is a view showing a specific message table 410 in the video game apparatus 100 to which specific messages are registered. The specific message table 410 is read from the storage medium 131 by the DVD/CD-ROM drive 113 and stored in the RAM 105 or HDD 107. In each record of the specific message table 410, as shown in FIG. 5, an even request code and a specific message character string are registered to be associated with each other.

The event request code corresponds to a content of a specific message, which is content of a statement of the non-player character 310 at the time of the event, generated by processing at the game server apparatus 200, and this is included in the event request. The specific message character string is displayed in the chat window 350 as words for the non-player character 310. When receiving the event request, the video game apparatus 100 does not display the event request itself as a message, but reads a specific message corresponding to the received event request (specifically, event request code included therein) from the specific message table 401, and display it in the chat window 350.

The specific messages are also scrolled and displayed from the bottom to the top in the chat window 350 when other messages are also sent from the game server apparatus 200. When the specific messages are scrolled up to an uppermost portion of the chat window 350, a specific message displayed portion is set as a lock window 360 (see FIG. 10). The lock window 360 is fixed and displayed on the display screen 122 until a fixed period of time passes since the display is started (substantially reception timing of the event request) or the player operates a predetermined button of the input section 161 to give an instruction of releasing.

The following will explain processing in the network game system according to this embodiment. Processing of the network game includes processing in which the player characters 321 to 324 are moved on the field 300 and the non-player character 310 is moved on the field 300 by processing of the game server apparatus 200 to generate a predetermined event according to the progress of the game. However, such processing does not directly relate to the present invention and the explanation thereof is omitted. The following will explain only processing necessary to scroll and display the messages in the chat window 350.

Figure 6:
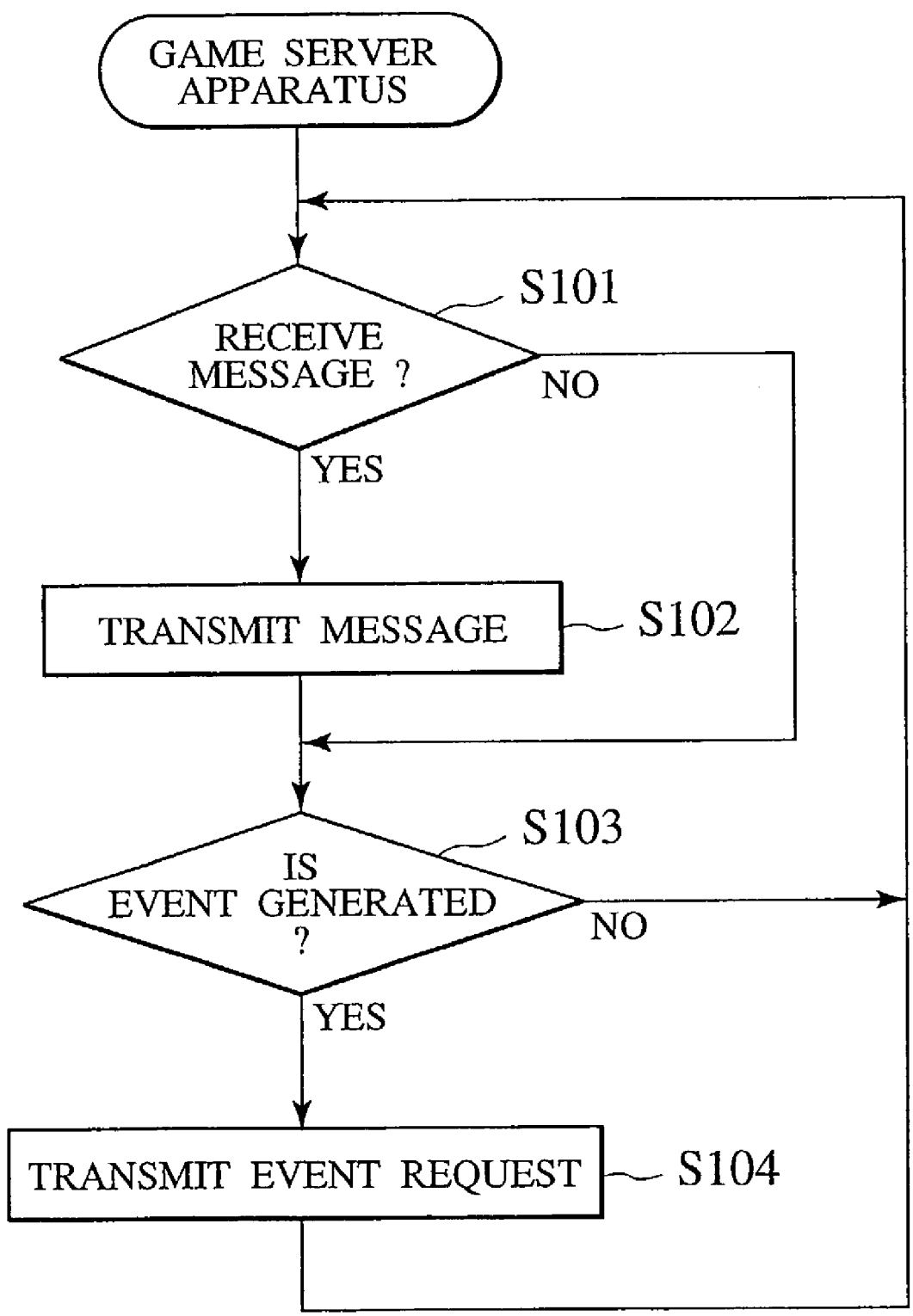
FIG. 6 is a flowchart showing processing executed by a game server apparatus in the network game system according to an embodiment of the present invention.

FIG. 6 is a flowchart showing processing that the control section 203 of the game server apparatus 200 executes. The control section 203 checks as to whether the communications interface 215 receives a message input from any one of the video game apparatuses 100 (step S101). When the communications interface 215 receives no message from any video game apparatuses 100, the processing flow proceeds to step S103.

When the communications interface 215 receives a message from any one or more of the video game apparatuses 100, the control section 203 causes all received messages to be transmitted to all video game apparatuses 100 from the communications interface 215 in order of reception via the network 151 (step S102). After that, the processing flow proceeds to step S103.

In step S103, the control section 203 determines whether the game advances to a predetermined state to generate a predetermined event, which the non-player character 310 states, in processing for the progress of the game executed separately from processing of this flowchart. When no case occurs where the predetermined event is generated, the processing flow returns to step S101, and the control section 203 checks the reception of a message from the video game apparatuses 100 again.

When the predetermined event is to be generated, the control section 203 prepares an event request code corresponding to the kind of event to be generated, and causes event requests including the relevant event request code to be transmitted to all video game apparatuses 100 from the communications interface 215 via the network 151 (step S104). After that, the processing flow returns to step S101 and the control section 203 checks for reception of a message from the video game apparatuses 100 again.

Figure 7:
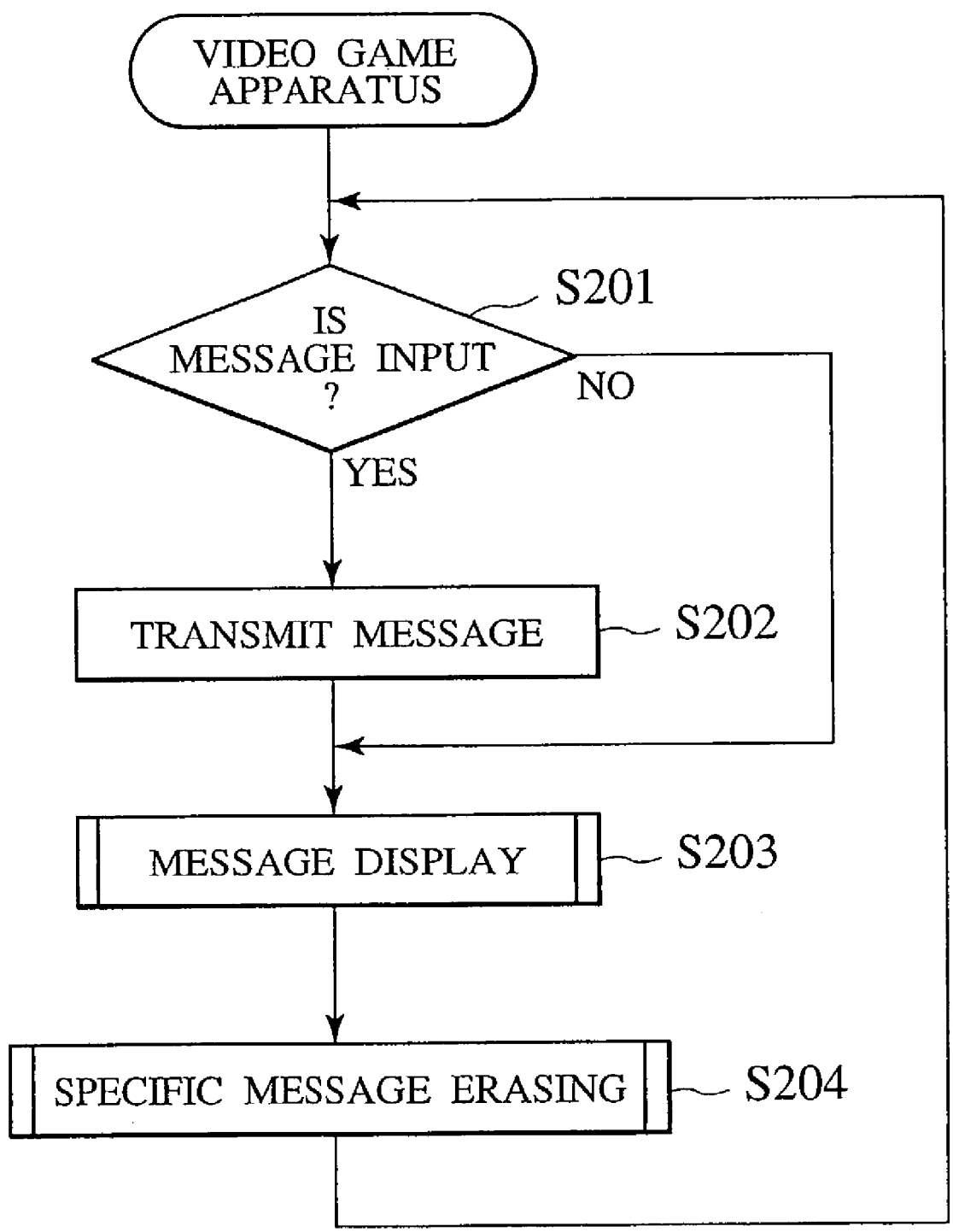
FIG. 7 is a flowchart showing processing executed by each video game apparatus in the network game system according to an embodiment of the present invention.

FIG. 7 is a flowchart showing processing executed by the control section 103 of each video game apparatus 100. In order to provide the chat window 350 and the lock window 360 on the display screen 122 and to display the messages in the chat window 350 and the lock window 360, image drawing processing by the graphics processor 111 is required in addition to processing by the control section 103. However, the control section 103 decides what information should be displayed on the display screen 122. The following will omit the explanation of image drawing processing by the graphics processor 111.

In each video game apparatus 100, the control section 103 determines whether the player has input some message from the input section 161 in processing executed separately from processing of this flowchart (step S201). When the player operates a predetermined key of the input section 161 (any character key in the case of the keyboard), a message input window appears on the display screen 122. The player operates a return key after inputting a character string for a message with reference to the message input window. It is determined that the player has input the message by the operation of the return key.

In the case where the player has not input any message, the processing flow proceeds to step S203. In the case where the player has input a message, the control section 103 causes a message input by the player to be transmitted to the game server apparatus 200 from the communications interface 115 via the network 151 (step S202). The message transmitted here is used as a message for which the control section 203 of the game server apparatus 200 determines as reception in step S101. After that, the processing flow proceeds to step S203.

In step S203, the control section 103 executes message display processing in which the messages transmitted from the game server apparatus 200 in step S102 or the specific messages corresponding to the event request transmitted from the game server apparatus in step S104 are sequentially scrolled and displayed in the chat window 350. When the message display processing is ended, the processing flow proceeds to step S204. Details on the message display processing will be given later.

In step S204, in the case where the specific message is displayed in the lock window 360 on the display screen 122, the control section 103 executes specific message display erasing processing for erasing the specific message. The specific message is erased when a fixed period of time passes since the start of displaying the specific message or when the player operates a predetermined button of the input section 161. When the specific message display erasing processing is ended, the processing flow returns to step S201. Details of the message display erasing processing will be given later.

Figure 8:
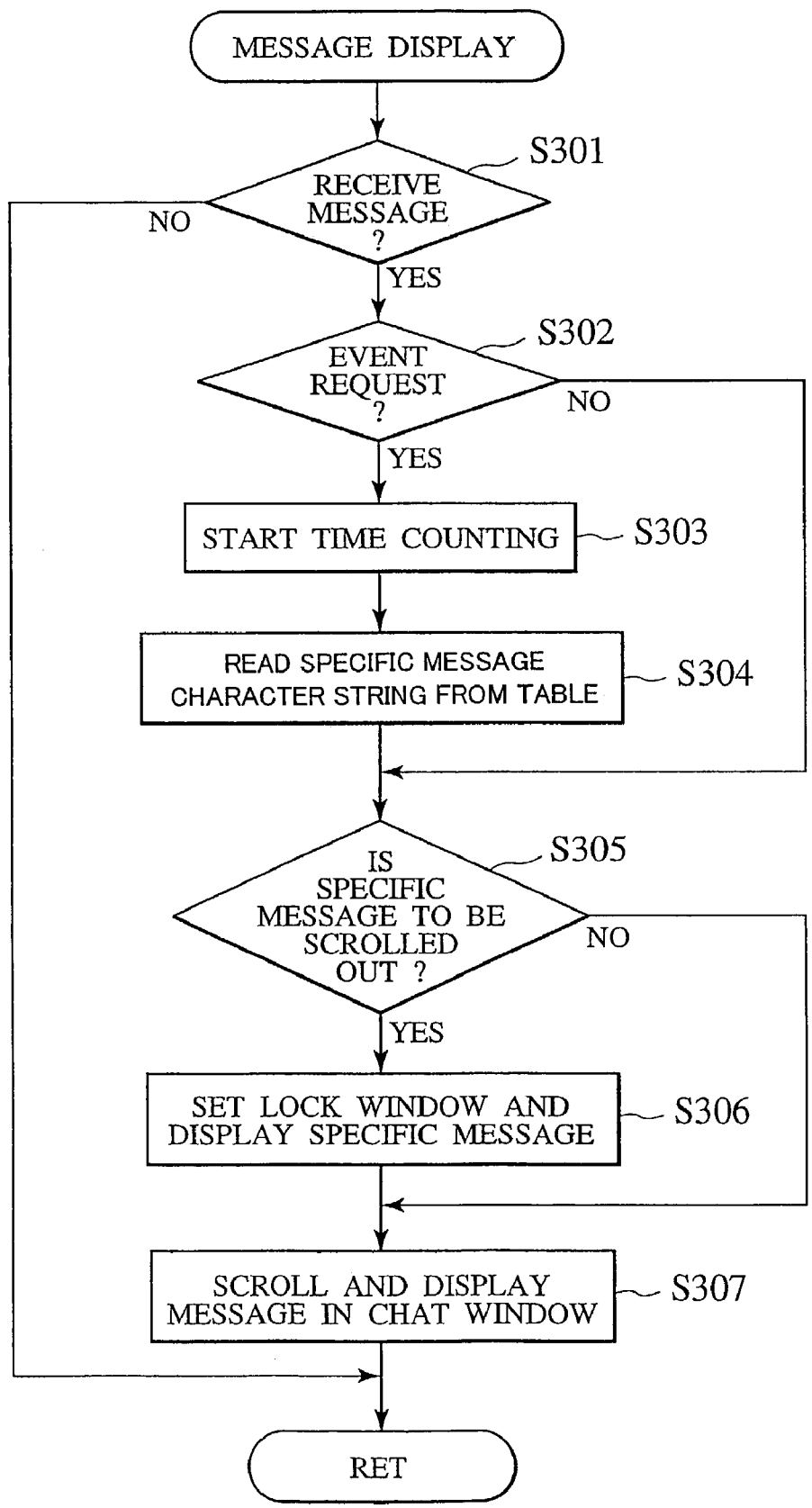
FIG. 8 is a flowchart specifically showing message display processing of FIG. 7.

FIG. 8 is a flowchart specifically showing the message display processing of step S203. In the message display processing, the control section 103 determines whether the communications interface 115 has received a message (the message transmitted in step S102 or the event request transmitted in step S104) transmitted from the game server apparatus 200 (step S301). If the communications interface 115 has not received the message from the game server apparatus 200, the control section 103 ends the message display processing directly, and the processing flow returns to processing of FIG. 7.

If the communications interface 115 has received the message from the game server apparatus 200, the control section 103 determines whether the received message is an event request (step S302). In the case where the received message is not an event request, the processing flow proceeds to step S305.

In the case where the received message is an event request, the control section 103 starts time counting using the internal timer (step S303). The control section 103 reads a specific message character string, which corresponds to an event request code included in the received event request, from the specific message table 410 (step S304). After that, the processing flow proceeds to step S305.

In step S305, the control section 103 scrolls the message, which is being currently displayed in the chat window 350, upwardly, and displays a message received from the game server apparatus 200 or a specific message whose character string is read in step S304 in the chat window 350. Thereafter, the control section 103 determines whether the specific message, which is currently being displayed, is to be scrolled out and erased from the chat window 350.

In the case where the specific message, which is currently being displayed, is not going to be scrolled out from the chat window 350, the processing flow proceeds to step S305. In the case where the specific message, which is currently being displayed, is going to be scrolled out from the chat window 350, the control section 103 sets the lock window 360, which has a size big enough to display the specific message being currently displayed, at the uppermost front side of the chat window 350. The control section 103 causes the specific message to be displayed in the lock window 360 (step S306). After that, the processing flow proceeds to step S307.

In step S307, the control section 103 displays and moves the message, which is being currently displayed in the chat window 350, upwardly by the number of lines that are necessary to display the message received from the game server apparatus 200 or the specific message whose character string is read in step S304. The control section 103 causes the message received from the game server apparatus 200 to be displayed on an area formed at a lower portion of the chat window 350 by display movement of the message. Or, the control section 103 causes the specific message whose character string was read in step S304 to be displayed on such an area. In the case of displaying the specific message, the control section 103 displays a cursor and the like at the end of the specific message to make it possible to identify. After that, the control section 103 ends the message display processing, and returns to processing of FIG. 7.

FIG. 9 is a flowchart specifically showing the specific message erasing processing of step S204. In the specific message erasing processing, the control section 103 first determines whether the lock window 360 has been set on the display screen 122 (step S401). In the case where the lock window 360 has not been set, the control section 103 ends the specific message erasing processing directly and returns to processing of FIG. 7.

In the case where the lock window 360 has been set, the control section 103 determines whether a fixed period of time has passed since the start of time counting in step S303 with reference to the internal timer (step S402). In the case where a fixed time has not passed since the start of time counting, the control section 103 determines whether the player has operated a predetermined button of the input section 161 (step S403). In the case where the player has not operated the predetermined button of the input section 161, the control section 103 ends the specific message erasing processing and returns to processing of FIG. 7.

In the case where a fixed time has passed since the start of time counted by the internal timer or the player has operated the predetermined button of the input section 161, the control section 103 releases the setting of the lock window 360. When the setting of the lock window 360 is released, the specific message displayed in the lock window 360 is displayed at the uppermost portion of the chat window 350 (step S404).

The control section 103 releases the designation of the specific message displayed at the uppermost portion of the chat window 350. The message displayed as the specific message can also be handled as a general message, and scrolled off the chat window 350 to be erasable when a new message is received (step S405). After that, the control section 103 ends the specific message erasing processing and returns to processing of FIG. 7.

The following will explain a specific example about a change in the messages displayed in the chat window 350 formed on the display screen 122 in each video game apparatus 100 of the network game system according to this embodiment. FIGS. 10A to 10F are views each showing a change in the messages displayed in the chat window 350. Here, messages as words for player characters 321 to 324 (messages input by the player) are expressed by AAA to DDD, and messages as words for non-player character 310 (specific messages) are expressed by NPC.

It is assumed that messages of five lines are displayed in the chat window 350 before an event is started as shown in FIG. 10A. These messages are sequentially transmitted to the game server apparatus 200 from the respective video game apparatuses 100 corresponding to the respective player characters 321 to 324, and from the game server apparatus 200 to each video game apparatus 100. The oldest message displayed in the chat window 350 is a message (AAA) as words for the player character 321 placed at the uppermost position.

It is assumed that an event is generated by processing at the game server apparatus 200. An event request corresponding to the generated event is sent to each video game apparatus 100 from the game server apparatus 200. When each video game apparatus 100 receives the event request from the game server apparatus 200, the control section 103 reads a specific message character string, which corresponds to an event request code included in the relevant event request, from the specific message table 410.

It is assumed that two lines are needed to display the specific message of the read character string in the chat window 350. Then, as shown in FIG. 10B, all of the messages displayed in the chat window 350 so far are displayed and moved upwardly by two lines, so that a specific message 400 is displayed in an area equivalent to two lines. Messages (AAA, BBB) as words for player characters 321 and 322 displayed on upper two lines of the chat window 350 in FIG. 10A are scrolled off the chat window 350 and erased from the display screen 122. A cursor (shown by ∇ in the figure) indicative of the specific message is displayed at the end of the specific message 400.

It is assumed that the player corresponding to the player character 321 inputs a message (one line) from the input section 161 with reference to this specific message, and that the message is transmitted to the game server apparatus 200 from the relevant video game apparatus 100. When this message is transmitted to each video game apparatus 100 from the game server apparatus 200, all of the messages (including the specific message 400) displayed in the chat window 350 so far are displayed and moved by one line as shown in FIG. 10C, so that a new message (AAA) is displayed on the lower line. Since the specific message 400 has not yet been established as a general message, the cursor stays added at the end of the specific message 400.

Moreover, it is assumed that the players corresponding to the player characters 322 and 323 input messages (each having one line) from the input section 161 and that the messages are transmitted to the game server apparatus 200 from the relevant video game apparatus 100. When these messages are transmitted to each video game apparatus 100 from the game server apparatus 200, all of the messages (including the specific message 400) displayed in the chat window 350 so far are displayed and moved by two lines.

By the display and movement of all of the messages, as shown in FIG. 10D, the specific message 400 is displayed at the uppermost portion of the chat window 350. New messages (BBB, CCC) for the player characters 322 and 323 are displayed on the lower two lines of the chat window 350 as shown in FIG. 10D, respectively. Here, since the specific message 400 has not yet been established as a general message, the cursor stays added at the end of the specific message 400.

Furthermore, it is assumed that the player corresponding to the player character 324 inputs a message (one line) from the input section 161 and that the message is transmitted to the game server apparatus 200 from the relevant video game apparatus 100. This message is transmitted to each video game apparatus 100 from the game server apparatus 200. If all of the messages in the chat window 350 are scrolled directly, the specific message will be scrolled out.

For this reason, as shown in FIG. 10E, the lock window 360 is provided at the front surface side of the uppermost portion of the chat window 350. The specific message 400 is displayed in the lock window 360. Here, since the specific message 400 has not yet been established as a general message, the cursor stays added at the end of the specific message 400. The display state of FIG 10E is shown to make processing of the video game apparatus 100 understandable.

As a result of providing the lock window 360, a display area where the message can be displayed in the chat window 350 is equivalent to three lines. At the time of displaying the message of the player character 324 in the chat window 350, since the specific message 400 is displayed in the lock window 360, a case does not occur where the specific message 400 is scrolled out and erased from the display screen 122.

In the chat window 350 having only the display area equivalent to three lines, the display and movement for one line necessary for displaying a new message are carried out. As shown in FIG. 10F, the message (AAA) of the player character 321 displayed just below the lock window 360 immediately before the display and movement is scrolled off the chat window 350 and erased. As a result, a message (DDD) of the player character 324 is displayed on the lowest line of the chat window 350.

As explained above, in the network game system according to this embodiment, the specific message 400 is displayed in the lock window 360 when being scrolled up to the uppermost portion of the chat window 350. As long as the player does not perform a release operation, the specific message 400 is not erased from the display screen 122 until a fixed period time passes since the start of displaying even if one or more messages are displayed. The specific message 400 is a message that is output as words for the non-player character 310. However, since the specific message 400 is a message that is output when a predetermined event is generated, this is an important message for the progress of the game. The players can recognize the specific message 400, which is necessary for the progress of the game.

The lock window 360 where the specific message 400 is fixed and displayed is released when the player operates a predetermined button of the input section 161 in addition to releasing after passing a fixed period of time since the start of displaying the specific message 400. If the player can check the specific message 400, the player can scroll out the specific message 400 at the player's will. This makes it easier for the player to recognize a new message.

Before reaching the uppermost portion of the chat window 350, the specific message 400 is scrolled and displayed from the bottom to the top, the same as the message input by the player in each video game apparatus 100. If the amount of messages received by each video game apparatus 100 is small, the same scroll-display can be carried out regardless of whether the messages are the specific message 400 or not. The position of the lock window 360, which displays the specific message 400 in a fixed manner, is the uppermost portion of the chat window 350 and the direction of scroll-display is from the bottom to the top. For this reason, the messages (including the specific message 400) displayed on the display screen 122 are always displayed in the time order in which the message was received.

In connection with the specific message 400, the character string showing the contents are registered in the specific message table 410 in each video game apparatus 100. At an event generating time, the game server apparatus 200 transmits only an event request, which may have less information than the character string showing the content of the message, to each video game apparatus 100. This is because the specific message 400 is no more than a predetermined content. By transmission of only such an event request, loads applied to the network and other resources are reduced. Each video game apparatus 100 can recognize that the event request code included in the event request shows the content (character string), and also recognize that the event request itself is the specific message 400.

The present invention is not limited to the aforementioned embodiment, and various modifications and applications may be possible. The following will explain the modifications of the aforementioned embodiment which are applicable to the present invention.

In the aforementioned embodiment, when an event is generated by processing of the game server apparatus 200, only an event request is transmitted to each video game apparatus 100. The content of the specific message 400 output as words for the non-player character 310 is registered as a specific message character string to the specific message table 410, and the character string is displayed as the content of the specific message 400 in the chat window 350. However, information on the character string indicating the content of the specific message 400 may be transmitted to each video game apparatus 100 from the game server apparatus 200 together with the event request without preparing the specific table 410 in each video game apparatus 100.

In the aforementioned embodiment, the specific message, as words for the non-player character 310, that is output when the event is generated by processing of the game server apparatus 200 is displayed in the lock window 360 and is not erased from the display screen 122 until a predetermined condition is satisfied. However, the message, which is important to the progress of the game, is not limited to this. For example, a message, as an instruction important to the progress of the game, that is sent to each video game apparatus 100 from the game server apparatus 200 may be also handled as a specific message and displayed in the lock window not to be erased from the display screen 122.

Regarding the messages other than the messages output by processing of the game server apparatus 200, for example, a message, which any one of the players inputs from the input section 161 of the relevant video game apparatus 100, may be handled as a specific message that cannot be erased from the display screen 122. Regarding the message as the specific message, when the player characters 312 to 324 corresponding to the players are party to one another to advance the game, it is possible to apply a message, which is input as words for the player character that becomes a leader of the party. In connection with this modification, the following will explain the differences from the aforementioned embodiment.

Figure 11:
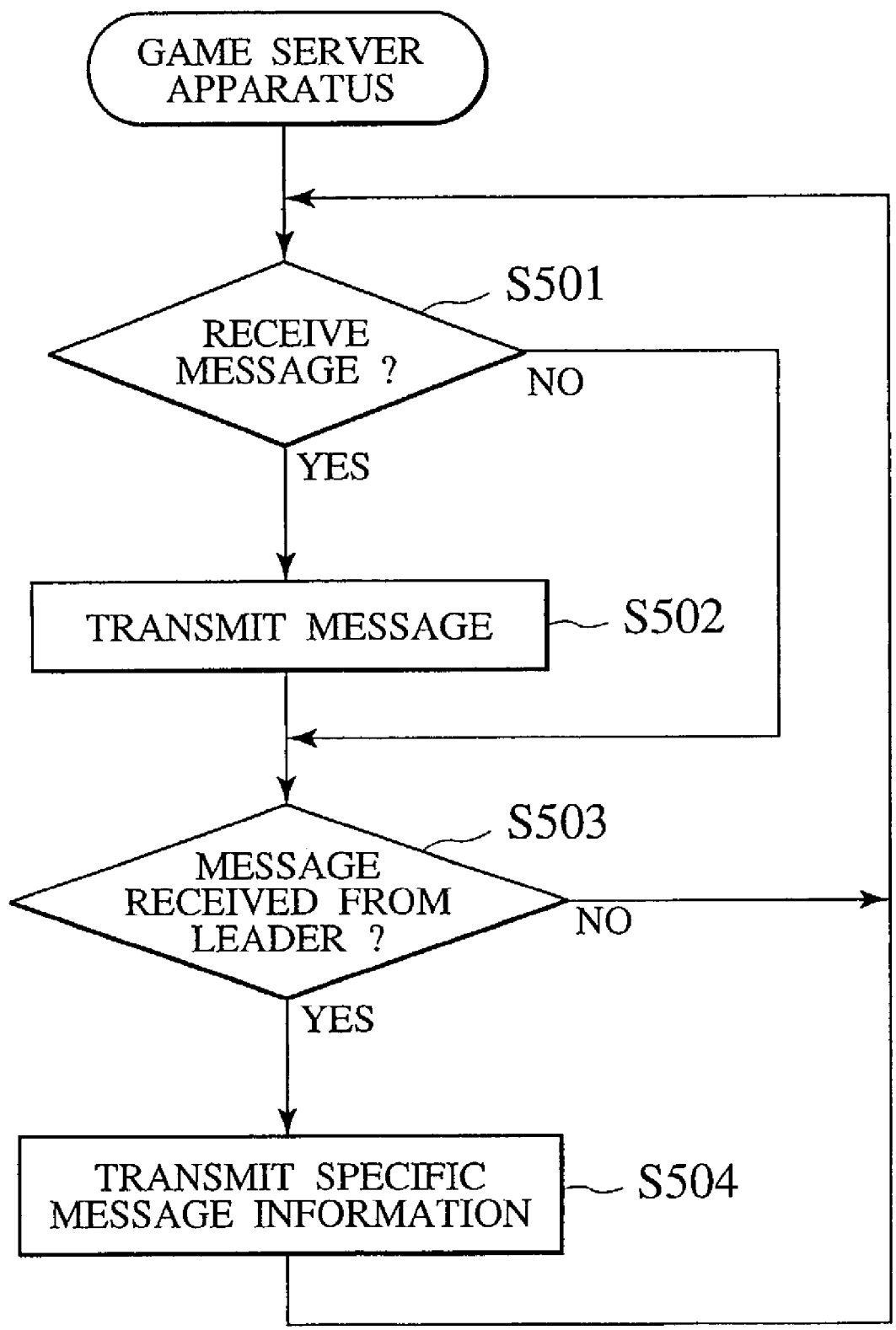
FIG. 11 is a flowchart showing processing executed by the game server apparatus in a modification of an embodiment of the present invention.

FIG. 11 is a flowchart showing processing that the control section 203 of the game server apparatus 200 executes. The control section 203 checks whether the communications interface 215 has received a message input from any one of the video game apparatuses 100 (step S501). If the communications interface 215 has not received a message from any video game apparatuses 100, the control section 203 repeats processing of step S501 and waits for the reception of a message.

In the case where the communications interface 215 has received the message from one or more of the video game apparatuses 100, the control section 203 causes all received messages to be transmitted to each video game apparatus 100 from the communications interface 215 via the network 151 in the order of reception (step S502). The control section 203 determines whether the message transmitted in step S502 is one that has received from the video game apparatus 100 of the player, who operates the player character as the leader of the party (step S503).

In the case where the transmitted message has not been received from the leader's video game apparatus 100, the control section 203 returns to processing of step S501 and waits for the reception of the next message. While, in the case where the message transmitted in step S502 is received from the leader's video game apparatus 100, the control section 203 causes specific message information, which includes information that can identify the message, to be transmitted from the communications interface 215 to all video game apparatuses 100 via the network 151 (step S504). Then, the control section 203 returns to processing of step S501 and waits for the reception of a next message.

FIG. 12 is a flowchart showing message display processing of step S203 that is executed by the control section 103 of the video game apparatus 100 in this modification. In the message display processing of this modification, the control section 103 determines whether the communications interface 115 has received the message transmitted from the game server apparatus 200 in step S502 (step S601). If the communications interface 115 has not received the message transmitted from the game server apparatus 200, the control section 203 ends the message display processing, and directly returns to the processing of FIG. 7.

If the communications interface 115 has received the message transmitted from the game server apparatus 200, the control section 203 determines whether the communications interface 115 has received specific message information transmitted from the game server apparatus 200 in step S504 within a predetermined period of time since the reception of the message (step S602).

If the communications interface 115 has not received specific message information transmitted from the game server apparatus 200, the control section 103 proceeds to processing of step S604. If the communications interface 115 has received specific message information transmitted from the game server apparatus 200, the control section 103 starts the time counting using the internal timer (step S603) and proceeds to processing of step S604. Processing from steps S604 through S606 is the same as the processing of steps S305 through S307 shown in FIG. 8. Even in this modification, the specific message erasing processing is the same as shown in the aforementioned embodiment.

As explained above, according to this modification, in the network game in which the message transmitted by the leader of the players is important to the progress of the game, this important leader's message can be recognized by other players without fail.

In the flowchart of FIG. 12, the time counting is started by the internal timer upon the reception of specific message information. However, the time counting may be started by the internal timer after the reception of the message is determined in step S601. In this case, the control section 103 of each video game apparatus 100 may stop the timing counting by the internal timer unless specific message information is received subsequent to the reception of the message.

The aforementioned embodiment has explained the following conditions to release the lock window 360 provided on the display screen 122 in each video game apparatus 100. Namely, a fixed period of time passes since the reception of the event request or the player operates a predetermined button of the input section 161. However, the conditions to release the lock window 360 are not limited to these. For example, the lock window 360 can be released after a fixed period of time passes since the provision of the lock window. Regarding whether the operation of the predetermined button of the input section 161 is used as a condition to release the lock window 360, the player may select such a condition on a configuration setting screen.

In the aforementioned embodiment, after the specific message 400 is scrolled up to the uppermost portion of the chat window 350, the lock window 360 is provided at the position to display the specific message 400 and the display of the specific message 400 is not erased until a predetermined condition is satisfied. However, the method for preventing the specific message 400 from being erased is not limited to this.

For example, instead of applying a special window such as the lock window 360, such control may be possible that surely selects the specific message 400 as a message to be displayed in the chat window 350 until the predetermined condition is satisfied. At the time of starting the display of the specific message 400, another window may be provided to overlap with the chat window 350 or at a position different from the position of the chat window 350, so that the specific message 400 can be displayed in this window until the predetermined condition is satisfied.

In the aforementioned embodiment, each video game apparatus 100 recognizes that the message displayed in the chat window 350 is used as the specific message 400 by receiving the event request as the message. In the modification shown by FIGS. 11 and 12, each video game apparatus 100 receives specific message information and thereby recognizes that the message received from the game server apparatus 200 is the specific message. However, the present invention is not limited to such a case.

For example, the game server apparatus 200 may add control information, indicative of a specific message, to a message itself including the character string to be displayed on the display screen 122 (regardless of whether it is the message input by any video game apparatuses 100 or the message output by processing of the game server apparatus 200). Then, the game server apparatus 200 may transmit the resultant message to each video game apparatus 100. The control section 103 of each video game apparatus 100 can determine whether the received message is the specific message based on control information added to the received message.

All of the character strings stored in each video game apparatus 100 as described in the event request do not have to be used as the specific messages even if they are character strings to be displayed in the chat window 350. The control section 103 of each video game apparatus 100 can determine whether a message, which causes the stored character string to be displayed, can be used as the specific message according to the event request code included in the event request.

Thus, it is possible to apply various kinds of methods for transmitting the specific message and information indicative of the specific message. The game server apparatus 200 adds information, indicative of the specific message, to the content of the message or a code indicating the content (corresponding to the aforementioned event request code), thereby making it possible to reduce the number of transmissions of information to each video game apparatus 100.

In the aforementioned embodiment, all messages input from the respective video game apparatuses 100 are once collected to the game server apparatus 200 and they are transmitted to each video game apparatus 100 from the game server apparatus 200. The message displayed in the chat window 350 is the message sent to each video game apparatus 100 from the game server apparatus 200. In contrast to this, the message can be displayed in the chat window 350 in the following order.

When the message is input from the input section 116, the control section 103 of each video game apparatus 100 causes the input message to be displayed in the chat window 350 without waiting for retransmission of the message from the game server apparatus 200. The control section 103 of each video game apparatus 100 determines whether the message received from the game server apparatus 200 is the message transmitted by the video game apparatus 100. If it is the message transmitted by the video game apparatus 100, the control section 103 abandons the received message without being redisplayed in the chat window 350. The message in the chat window 350 is thereby displayed in the order that complies with time when the player inputs the message and the time when the player receives the message in each video game apparatus 100. The message in the chat window 350 is displayed according to the sequence of each player's thinking.

The aforementioned embodiment has explained an example of the case that the present invention is applied to the network game in which the respective players of the video game apparatuses 100 move their player characters 321 to 324 to advance the game. However, the present invention can be applied to the general network games in which the players advance the game while chatting via the network regardless of whether the player characters appear or not. Regarding the client-side apparatuses that the respective players use, there can be used general-purpose computers or cellular phones having a network connection function and an application executing function. The types of client side-apparatuses that the respective players use may be mixed.

In the aforementioned embodiment, the program and data of the video game apparatus 100 are stored in the storage medium 131 and distributed. The program and data of the game server apparatus 200 are stored in the storage medium 231 and distributed. In contrast to these, these programs and data may be stored to a fixed disk device that a Web server apparatus existing on the network 151 has. In accordance with a request from each of the video game apparatuses 100 or the game server apparatus 200, the Web server apparatus may convert program data stored in the fixed disk device to a signal, and may superimpose the signal on a carrier wave to distribute to the video game apparatus 100 or the game server apparatus 200 via the network 151.

In the video game apparatus 100, the program and data, which the communications interface 115 has received from the Web server, can be stored in the HDD 107 and loaded on the RAM 105 at an executing time. In the game server apparatus 200, the program and data, which the communications interface 117 has received, can be stored in the HDD 207 and loaded on the RAM 205 at an executing time.

Although the invention has been described with reference to several exemplary embodiments, it is understood that the words that have been used are words of description and illustration, rather than words of limitation. Changes may be made within the purview of appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A network game system having a server apparatus and a plurality of client apparatuses each connected to said server apparatus via a network, said server apparatus comprising:

a server message receiver that receives messages from each of said plurality of client apparatuses;

a server message transmitter that transmits messages on progress of a game including the messages received by said server message receiver to each of said plurality of client apparatuses via the network; and a specific information transmitter that transmits specific information when said server message transmitter transmits a specific message, the specific information indicating that the transmitted message is the specific message, each of said plurality of client apparatuses comprising:

a message input device that inputs a desired message on the progress of the game according to a user's operation;

a client message transmitter that transmits the messages input from said message input device via said network to cause said server message receiver to receive the messages;

a client message receiver that receives messages transmitted from said server message transmitter;

a specific information receiver that receives the specific information transmitted from said specific information transmitter;

a message display device that displays messages received by said client message receiver within a chat window while scrolling the messages sequentially; and a display controller that controls scroll-display displayed by said message display device such that the received messages are sequentially scrolled to erase an oldest message from the chat window, and display of the message corresponding to specific information received by said specific information receiver is prevented from being erased from the chat window by the scrolling a until a predetermined condition is satisfied, when the specific message is the oldest message and otherwise would be erased by scrolling in response to displaying a new message.

2. A game server apparatus, connected to a plurality of client apparatuses via a network, comprising:
- a message receiver that receives messages input by players of the plurality of client apparatuses via the network;
- a message transmitter that transmits messages on progress of a game including the messages received by said message receiver via the network such that the messages are sequentially scrolled and displayed in a chat window of each of said plurality of client apparatuses; and
- a specific information transmitter that transmits specific information when said message transmitter transmits a specific message such that display of the specific message in the chat windows is prevented from being erased by scrolling in each of said plurality of client apparatuses until a predetermined condition is satisfied when the specific message is the oldest message and the otherwise would be erased by scrolling in response to displaying a new message.

3. The game server apparatus according to claim 2, further comprising an event generator that generates a predetermined event according to the progress of the game, wherein the specific message comprises a message transmitted according to the predetermined event.

4. The game server apparatus according to claim 2, wherein the specific message comprises a message that said message receiver has received from a specific client apparatus.

5. The game server apparatus according to claim 2, wherein the specific information is added to the specific message, and said specific information transmitter is included in said message transmitter that transmits the message having the specific information added.

6. A game server apparatus connected to a plurality of client apparatuses via a network, comprising:
- a memory that stores a network game program;
- a processor that executes the network game program; and
- a communications apparatus that performs communications with the plurality of client apparatuses,
- the network game program causing the processor to execute:
- receiving messages input by players of the plurality of client apparatuses via the network;
- transmitting messages on progress of a game including the messages received from the client apparatuses via the network such that the messages are sequentially scrolled and displayed in a chat window of each of the client apparatuses; and
- transmitting specific information such that display of a specific message is prevented from being scrolled and erased from the chat window in each of the client apparatuses until a predetermined condition is satisfied, when scrolling other messages as a result of displaying a new message.

7. A video game apparatus connected, via a network, to a server apparatus, which is connected to at least one other video game apparatus via the network, said video game apparatus comprising:
- a message input device that inputs a desired message on the progress of a game according to a player's operation;
- a message transmitter that transmits the message input from said message input device to the server apparatus via the network;
- a message receiver that receives messages on the progress of the game, including the messages received from the video game apparatuses connected to the server apparatus, from the server apparatus via the network;
- a specific information receiver that receives specific information from the server apparatus via the network, when a message to be received by said message receiver is a specific message, which specific information indicates that the received message is the specific message;
- a message display device that displays messages received by said message receiver in a chat window while scrolling the messages sequentially; and
- a display controller that controls scroll-display displayed by said message display device such that display of a message corresponding to specific information received by said specific information receiver is prevented from being scrolled and erased from the chat window until a predetermined condition is satisfied, when scrolling other messages as a result of displaying a new message.

8. The video game apparatus according to claim 7, wherein the predetermined condition is satisfied when a predetermined period of time passes after receiving the specific information or a message corresponding to the specific information.

9. The video game apparatus according to claim 7, wherein the predetermined condition is satisfied when the player performs a predetermined operational input.

10. The video game apparatus according to claim 7, wherein said display controller controls the scroll-display such that the message corresponding to the specific information is scrolled up to a predetermined position and thereafter the message is fixed and displayed to be prevented from being scrolled from the position.

11. The video game apparatus according to claim 7, wherein the specific message comprises a message transmitted according to a predetermined event generated by the server apparatus according to the progress of a game.

12. The video game apparatus according to claim 11, further comprising a specific message storage that stores identification information peculiar to the specific message in association with a content of the specific message,
wherein said message receiver receives the identification information of the specific message, and said message display device reads the content of the specific message corresponding to the identification information received by said message receiver from said specific message storage, and displays the read content.

13. The video game apparatus according to claim 7, wherein said message display device displays messages input by said message input device and the messages input by the other video game apparatuses among the messages received by said message receiver, alternately, while scrolling the messages sequentially.

14. The video game apparatus according to claim 7, wherein the specific information is added to the specific message, and said specific information receiver is included in said message receiver that receives the message having the specific information added.

15. A video game apparatus connected, via a network, to a server apparatus, which is connected to at least one other video game apparatus via the network, said video game apparatus comprising:
- a memory that stores a network game program;
- a processor that executes the network game program;
- a display device that displays a processing result of the network game program performed by said processor; and
- a communications apparatus that communicates with the server apparatus,
- the network game program causing said processor to execute:
- inputting a desired message on progress of a game according to a user's operation, transmitting the input message to the server apparatus via the network;
- receiving messages on the progress of the game including the messages, which the server apparatus received from said video game apparatus and the other video game apparatuses, from the server apparatus via the network;
- receiving specific information from the server apparatus via the network, when a message to be received is a specific message, which specific information indicates that the received message is the specific message; and
- displaying the received messages in a chat window while scrolling the messages sequentially such that display of the message corresponding to the specific information among the received messages is prevented from being scrolled and erased from the chat window in a display area on a display device until a predetermined condition is satisfied, when scrolling other messages as a result of displaying a new message.

16. A message transmitting method in a network game executed in a server apparatus connected to a plurality of video game apparatuses via a network, comprising:
- receiving messages input by players of the plurality of video game apparatuses via the network;
- transmitting messages on progress of a game including the messages received from the plurality of video game apparatuses via the network such that the messages are sequentially scrolled and displayed in a window in each of the plurality of video game apparatuses; and
- transmitting specific information such that display of a specific message is prevented from being scrolled and erased from the window in a display area on a display device in each of the plurality of video game apparatuses until a predetermined condition is satisfied, when scrolling other messages as a result of displaying a new message.

17. A message display controlling method in a network game executed in a video game apparatus connected to a server apparatus, which is connected to at least one other video game apparatus, via a network, comprising:
- inputting a desired message on progress of a game according to a player's operation;
- transmitting the input message to the server apparatus via the network;
- receiving messages on the progress of the game including messages, which the server apparatus received from said video game apparatus and the other video game apparatuses, from the server apparatus via the network;
- receiving specific information, from the server apparatus via the network, when a message to be received is a specific message, which specific information indicates that the received message is the specific message; and
- displaying the received messages in a chat window while scrolling the messages sequentially such that display of the message corresponding to the specific information among the received messages is prevented from being erased, by scrolling, from the chat window in a display area on a display device until a predetermined condition is satisfied.

18. A computer-readable storage medium on which a network game program is recorded, the program causing a computer connected to a plurality of client apparatuses via a network to execute:
- receiving messages input by players of the plurality of client apparatuses via the network;
- transmitting messages on progress of a game including the messages received from the client apparatuses via the network such that the messages are sequentially scrolled and displayed in a window in each of the client apparatuses; and
- transmitting specific information such that display of a specific message is prevented from being erased, by scrolling, from the window in a display area on a display device in each of the plurality of video game apparatuses until a predetermined condition is satisfied.

19. A computer-readable storage medium on which a network game program is recorded, the program causing a computer connected, via a network, to a server apparatus, which is connected to at least one other video game apparatus via the network to execute:
- inputting a desired message on progress of a game according to a user's operation, transmitting the input message to the server apparatus via the network;
- receiving messages on the progress of the game including the messages, which the server apparatus received from said video game apparatus and the other video game apparatuses, from the server apparatus via the network;
- receiving specific information, from the server apparatus via the network, when a message to be received is a specific message, which specific information indicates that the received message is the specific message; and
- displaying the received messages in a chat window while scrolling the messages sequentially such that the display of the message corresponding to the specific information among the received messages is prevented from being erased, by scrolling, from the chat window in a display area on a display device until a predetermined condition is satisfied.

20. A carrier wave having a data signal of a network game program, which is executed by a computer apparatus connected to a plurality of client apparatuses via a network, superimposed thereon, wherein the program causes the computer to execute:
- receiving messages input by players of the plurality of client apparatuses via the network;
- transmitting messages on progress of a game including the messages received from the client apparatuses via the network such that the messages are sequentially scrolled and displayed in a chat window in each of the client apparatuses; and
- transmitting specific information such that display of a specific message is prevented from being erased and scrolled from the chat window in a display area on a display device in each of the plurality of video game apparatuses until a predetermined condition is satisfied, when scrolling other messages as a result of displaying a new message.

21. A carrier wave having a data signal of a network game program, which is executed by a computer apparatus connected, via a network, to a server apparatus, which is connected to at least one other video game apparatus via the network, superimposed thereon, wherein the program causes the computer apparatus to execute:

inputting a desired message on progress of a game according to a user's operation, transmitting the input message to the server apparatus via the network;

receiving messages on the progress of the game including the messages, which the server apparatus received from said video game apparatus and the other video game apparatuses, from the server apparatus via the network;

receiving specific information, from the server apparatus via the network, when a message to be received is a specific message, which specific information indicates that the received message is the specific message; and displaying the received messages in a window while scrolling the messages sequentially such that display of the message corresponding to the specific information among the received messages is prevented from being erased, by scrolling, from the window in a display area on a display device until a predetermined condition is satisfied.

* * * * *